US010305613B2

(12) United States Patent
Guo

(10) Patent No.: US 10,305,613 B2
(45) Date of Patent: May 28, 2019

(54) METHOD AND SYSTEM FOR DETECTING IMAGE DELAY

(71) Applicant: Hangzhou Hikvision Digital Technology Co., Ltd., Zhejiang (CN)

(72) Inventor: Bin Guo, Zhejiang (CN)

(73) Assignee: Hangzhou Hikvision Digital Technology Co., Ltd., Zhejiang (CN)

( * ) Notice: Subject to any disclaimer, the term of this patent is extended or adjusted under 35 U.S.C. 154(b) by 0 days.

(21) Appl. No.: 15/564,069

(22) PCT Filed: Dec. 22, 2015

(86) PCT No.: PCT/CN2015/098330
§ 371 (c)(1),
(2) Date: Oct. 3, 2017

(87) PCT Pub. No.: WO2016/173279
PCT Pub. Date: Nov. 3, 2016

(65) Prior Publication Data
US 2018/0097573 A1    Apr. 5, 2018

(30) Foreign Application Priority Data

Apr. 30, 2015    (CN) .......................... 2015 1 0218171

(51) Int. Cl.
*H04B 17/364*    (2015.01)
*H04N 17/00*    (2006.01)
(Continued)

(52) U.S. Cl.
CPC .......... *H04B 17/364* (2015.01); *H04J 3/0667* (2013.01); *H04N 5/95* (2013.01);
(Continued)

(58) Field of Classification Search
CPC ...... H04B 17/364; H04N 17/00; H04N 17/04; H04N 5/95; H04N 7/181
See application file for complete search history.

(56) References Cited

U.S. PATENT DOCUMENTS

| 2004/0244055 A1* | 12/2004 | Takada .................... H04N 5/76 725/134 |
| 2012/0172118 A1* | 7/2012 | Shimamura ............. H04R 3/04 463/31 |
| 2014/0351874 A1 | 11/2014 | Yoo et al. |

FOREIGN PATENT DOCUMENTS

| CN | 103813161 A | 5/2014 |
| EP | 2800331 A1 | 11/2014 |

OTHER PUBLICATIONS

Office Action for CN application No. CN 201510218171.6; dated Aug. 28, 2017; 5 pages.
(Continued)

*Primary Examiner* — Kan Yuen
(74) *Attorney, Agent, or Firm* — Mark E. Bandy; Rankin, Hill & Clark LLP

(57) ABSTRACT

The present application discloses a method and system for detecting image delay, the method comprises: for any one of image frames in an incoming data stream and a data packet of image delay detection for the image frame, displaying the image frame and analyzing the data packet; and obtaining a detected image delay $T_{delay}$ of the image frame according to a reference globe time T for collecting the image frame obtained by analyzing the data packet and current display time $T_{display}$ of the image frame. In the present application, delay detection data are identified in an image frame and the collection time is based on the time of a display device, which enables to provide an automatic and accurate method and system for accurately measuring camera delay without the need of manual operation.

17 Claims, 3 Drawing Sheets

(51) Int. Cl.
  *H04N 17/04* (2006.01)
  *H04N 5/95* (2006.01)
  *H04N 21/41* (2011.01)
  *H04N 21/43* (2011.01)
  *H04N 21/436* (2011.01)
  *H04N 21/8547* (2011.01)
  *H04J 3/06* (2006.01)
  *H04N 7/18* (2006.01)

(52) U.S. Cl.
  CPC ............. *H04N 17/00* (2013.01); *H04N 17/04* (2013.01); *H04N 21/4122* (2013.01); *H04N 21/4305* (2013.01); *H04N 21/43615* (2013.01); *H04N 21/8547* (2013.01); *H04N 7/181* (2013.01)

(56) References Cited

OTHER PUBLICATIONS

Extended European Search Report; Application No. 15890653.7; dated Oct. 29, 2018; 8 pages.

\* cited by examiner

METHOD AND SYSTEM FOR DETECTING IMAGE DELAY

The present application claims the priority to a Chinese patent application No. 201510218171.6 filed with the State Intellectual Property Office of People's Republic of China on Apr. 30, 2015 and entitled "METHOD AND SYSTEM FOR DETECTING IMAGE DELAY", which is incorporated herein by reference in its entirety.

TECHNICAL FIELD

The present application relates to the field of video monitoring, and particularly relates to a method and a system for detecting image delay during video monitoring.

BACKGROUND

In the field of video monitoring, it often involves collecting and processing (such as compressing, encoding and so on) of images by a camera, signal transmitting, analyzing (such as decoding, decompressing) and displaying of an image by a display terminal and the like. However, delay of the collected image (i.e., collecting and displaying are not completely synchronised in real time) appears during the final display due to the problems such as instability of apparatuses, transmission routes (such as network).

Image delay is a key parameter in the field of video monitoring. A shorter image delay represents a better overall performance of video monitoring such as transmission and back-end processing of a camera during video monitoring, and the image delay can reflect the real-time display condition of an image. As a result, it is very important regarding how to accurately measure (or detect) the image delay in a video monitoring environment, which helps to further improve the video monitoring environment and reduce the image delay as much as possible.

At present, a commonly used method for measuring a camera delay (referred to as "image delay" below) is as follows.

Firstly, a timer (precision of which is typically millisecond order of magnitude) is run on a computer, and a camera is arranged to aim to the timer interface on a computer display, and then a client software, which can preview the camera on the computer that is running the timer, is performed. Finally, a screenshot operation is performed for the computer, and the difference (image delay in general sense in the field of video monitoring) between the time of the timer and the time of the client preview picture is calculated according to the screenshot of the camera.

However, the biggest disadvantage of this method is that manual operation is needed for the screenshot operation, which is tedious and time-consuming, and the final step of performing the screenshot operation is susceptible to the computer screen refresh rate, which can lead to an error up to a magnitude of 10 ms. For example, for a display with a refresh rate of 60, if the numbers on a timer are supposed to update at a certain moment, but the camera is performing the screenshot operation at this moment and it is needed to wait for 16.6 ms to refresh due to the screen refresh, then it leads to an error of 16.6 ms, which in turn leads to a larger error for a camera delay.

Moreover, for image data of one frame, the image of this frame is displayed after being collected, encoded, compressed and transmitted. Normally, it is always necessary to carry out buffering for data reception and buffering for playing after decoding, and it is very important to find a particular frame of data (this frame of data records the current collecting time) in a queue of data and play buffering and this parameter should be as accurate as possible. However, a camera and a computer serving as a display terminal both have their own system time. If refresh is carried out now, it will also make the time obtained from a computer screenshot by a camera inaccurate due to the display frequency of the computer, which renders the obtained time inaccurate.

Thus, how to measure the camera delay accurately and automatically is a problem that is urgent to be solved by a person skilled in the art.

In addition, a document of "a method for measuring a one-way delay" in the prior art proposed a technical solution of sending a message from a source endpoint to an target endpoint, then immediately returning, by the target endpoint, the message to the source endpoint, calculating the round-trip time of the message between the two endpoints, then dividing it by two, and then obtaining the one-way delay time. However, in this method, only the delay of message data transmission is considered, data format and content carried by a data packet have no effect on the result in addition to the address information and time information for recording the source and target endpoints, and transmitting and receiving of a message between two endpoints are both carried out synchronously and there is no need to wait at the endpoints. A person skilled in the art knows that the composition or the influencing factors of an image delay at least include: the time for collecting an image, the time for encoding an image, the time for transmitting compressed data, the time for analyzing and decoding compressed data, the time for displaying image data and the like. Image delay in the field of video monitoring is defined as the time difference between the time when a camera starts to collect an image and the time when the display by a display terminal (client/terminal, server and the like) completes for the same frame of picture (i.e., image). However, if data of a frame of picture in a camera are displayed after they are collected, encoded, compressed and transmitted, then buffering for data reception and buffering for playing after decoding are normally carried out, that is to say, the factors in reality that lead to a delay is far more complicated than the factor of only message transmission delay recited in the above document, and thus the method proposed by this prior art is not able to detect the camera delay.

Thus, it is necessary to provide a method and a system capable of automatically and thus more accurately measuring image delay without needs of manual operation.

SUMMARY

An object of the present application is to provide a method and system for detecting image delay, which overcome the disadvantages of obtaining the image delay only by manual operations in the prior art of the video monitoring, and solve the problem presenting when obtaining the image delay by automatic detection, and further, on the basis of automatic detection, overcome the disadvantage of a larger error produced by manual detection and solve the problem presenting during automatically detecting the image delay with a high precision.

In order to solve the above-mentioned problems, in one aspect, the present application provides a method for detecting image delay. The method includes: for any one of image frames in an incoming data stream and a data packet of image delay detection for the image frame, displaying the image frame and analyzing the data packet; and obtaining a detected image delay $T_{delay}$ of the image frame according to a reference global time T for collecting the image frame obtained by analyzing the data packet and current display time $T_{display}$ of the image frame.

In another aspect, the present application provides a system for detecting image delay. The system includes: an image obtaining device, an image processing device, and a communication line connecting the image obtaining device and the image processing device; wherein, the image processing device is configured to, for any one of image frames in data stream transmitted via the communication line from the image obtaining device and a data packet of image delay detection for the image frame, display the image frame and analyze the data packet, then obtain the detected image delay $T_{delay}$ of the image frame according to a reference global time T for collecting the image frame obtained by analyzing the data packet and current display time $T_{display}$ of the image frame; and the image obtaining device is configured to collect an image frame and determine the reference global time T of the collected image frame according to an image delay detection message transmitted by the image processing device for the image frame.

The present application also provides an application program, which is configured to carry out the method for detecting image delay when executed.

The present application also provides a storage medium, which is configured to store an application program that is configured to carry out the method for detecting image delay.

According to the technical solutions of the present application, temporal data of the data related to delay detection are determined based on the final time of an image displayed by a display terminal, and the data related to delay detection are encapsulated with the encoded data of a detected image frame. In this way, manual operation (such as obtaining the time for collecting an image by a screenshot and the like) is not needed and the collection time is not affected by frequency refresh of an image frame on a display terminal, the difference in system time between the display terminal and a collecting and obtaining terminal. Delay results obtained by the method and system provided by the present application have no errors, which makes the detection of image delay more accurate.

BRIEF DESCRIPTION OF THE DRAWINGS

FIG. 2 is a timing diagram of an embodiment of the system according to the present application;

DETAILED DESCRIPTION

In order to make the objects, technical solutions and advantages of the present application more clear, the present application will be further described below in detail in combination with the detailed embodiments with reference to the drawings. It should be noted that these descriptions are only illustrative and not intended to limit the scope of the present application. Besides, in the following description, the description of common structures and technologies is omitted so as to avoid unnecessary obscuring of the concept of the present application.

Figure 1:
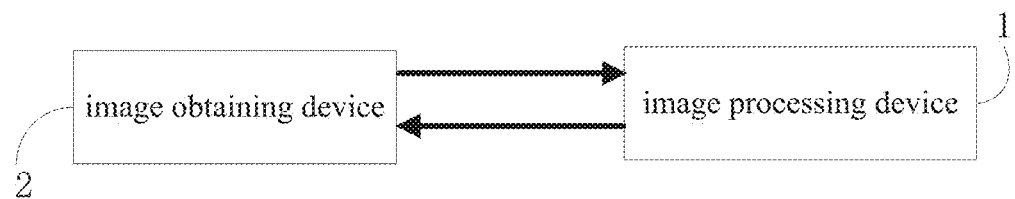
FIGS. 1-1, 1-2 are structural block diagrams of an embodiment of a system detecting image delay according to the present application.
Figures 1, 2:
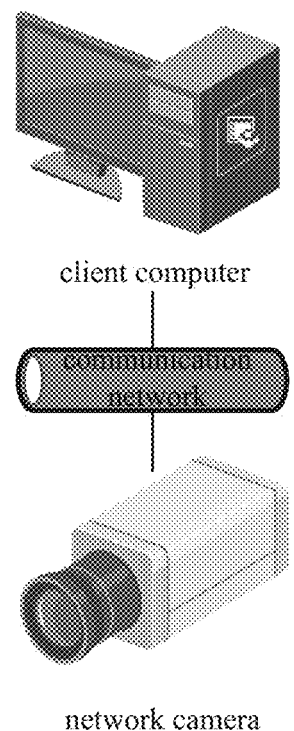
Figure 2:
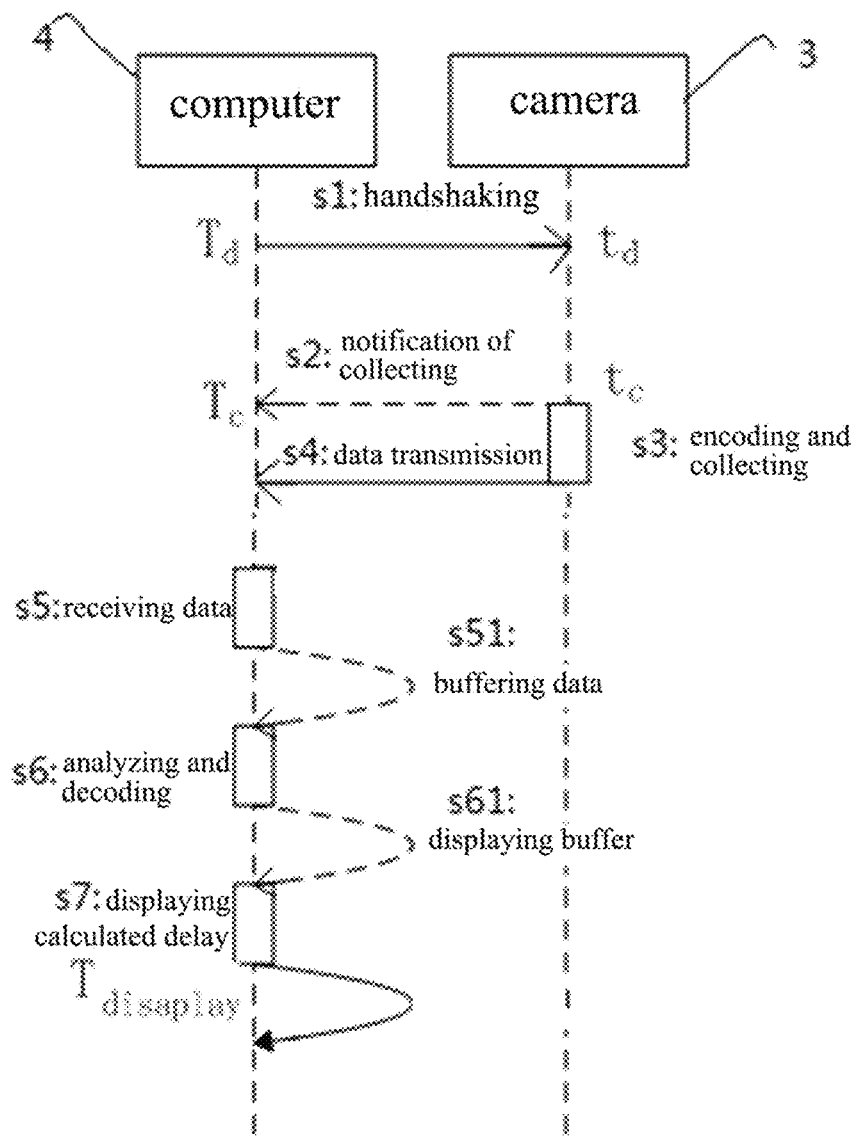

FIGS. 1-1, 1-2 are structural block diagrams of an embodiment of a system for detecting image delay according to the present application.

The description will be made below in combination with the embodiments of the system for detecting image delay of the present application as shown in FIG. 1.

The system for detecting image delay at least includes: one or more image obtaining devices 1, one or more image processing devices 2, and wherein the image obtaining device 1 and the image processing device 2 transmit images via a network.

In an implementation, the image obtained by the image obtaining device 1 (e.g., a camera in the field of video monitoring) is a real-time image collected (e.g. shot) by a camera during monitoring. Further, this camera may be a network camera, or a combination of an analog camera and an encoder. The following description will be made by taking a network camera as an example. The image processing device 2 can be any device that is capable of displaying images obtained by the image obtaining device 1 and transmitted via a network (e.g., various wire communication networks or various wireless communication networks). The image processing device 2 can be a client computer, various terminal apparatuses that are capable of displaying or playing an image and/or various servers that are capable of displaying or playing an image and the like. The image delay is defined as, for a same image frame, the time difference between the time when the image obtaining device 1 starts to collect an image and the time when the displaying by the image processing device 2 completes.

Further, when the image obtaining device 1 obtains an image and transmits it to the image processing device 2 for display, the time difference, from the time when the image obtaining device 1 starts to collect an image frame to the time when the displaying of the image frame on the image processing device 2 completes, is regarded as the delay of this image frame.

FIG. 2 is a timing diagram of an embodiment of the system according to the present application.

Detailed description will be made below in combination with the timing diagram of an embodiment of a delay detection system of the present application as shown in FIG. 2.

(A) The image obtaining device 1 (e.g., a camera) is added with a communication interface that supports messages with a certain format. Meanwhile, the image processing device 2 (e.g., a client computer) is also provided with a communication interface that supports messages with this format. The communication interface and message format can be any existing known communication interface and message format that are capable of supporting the transmission of image data. The message format includes, but not limited to, an IP message format, a TCP message format, a UDP message format and the like. The image obtaining device 1 and the image processing device 2 are connected via a communication network so as to transmit image data, and send and receive messages via the communication interface.

(B) The image processing device 2 sends a delay detection message to the image obtaining device 1 according to the message format of this newly-added communication interface of the image obtaining device 1. This message may include a ID number (e.g., GUID) of the current detection, which is used for uniquely identifying the current detection for image delay; the communication address of the image processing device 2 (e.g., if the communication system is Ethernet, the communication address of the image processing device 2 can be the IP address of the device); the current global time of the image processing device 2 is $T_d$ (year, month, date, hour, minute, second and millisecond). Here, GUID (Globally Unique Identifier) uniquely represents the ID number of the current detection. The uniqueness can be realized by GUM but is not limited thereto, that is to say, it can also be realized by a self-designed method.

(C) After receiving the delay detection message sent by the image processing device 2, the image obtaining device 1 records the current global time $t_d$ (year, month, date, hour, minute, second and millisecond) of the image obtaining device 1, the ID number of the current detection, the communication address of the image processing device 2 and the global time $T_d$ when the image processing device 2 initiates the detection. Right now, the image obtaining device 1 shake hands with the image processing device 2. However, the image obtaining device 1 does not immediately return a message to the image processing device 2, instead, the image obtaining device 1 waits for the moment when it starts to collect data of the next image frame.

(D) When the image obtaining device 1 starts to collect the next image frame, the time $t_c$ (year, month, date, hour, minute, second and millisecond) for starting to collect the image is recorded. Meanwhile, according to the recorded communication address of the image processing device 2, a message is sent to the image processing device 2 that initiate the detection. The message includes the previously received ID number of the detection, i.e., the image obtaining device 1 sends a collection notification message to the corresponding image processing device 2. Moreover, the collected image frame is encoded for data transmission. The current time $T_c$ (year, month, date, hour, minute, second and millisecond) is recorded, after the image processing device 2 receives the collection notification message that the image obtaining device 1 is collecting images.

(E) At the image processing device 2 or the image obtaining device 1 or an intermediate side between them, it is possible to calculate one-way delay $T_{latency}$ of communication between the image obtaining device 1 and the image processing device 2, according to global time $T_d$ of the image processing device 2 when it sends a delay detection message, the global time $t_d$ of the image obtaining device 1 when it receives the delay detection message, the time $t_c$ when the image obtaining device 1 starts to collect the first image frame after handshaking, and the time $T_c$ when the image processing device 2 receives a collection notification message that the image obtaining device 1 is collecting this image frame.

For example, the calculation is carried out with equation (1):

$$T_{latency}=((T_c-T_d)-(t_c-t_d))/2. \tag{1}$$

For example, the calculation is carried out with the algorithm in the document of "a method for measuring one-way delay".

The result obtained from equation (1) is very close to the result obtained from the method for measuring one-way delay in this document, but in the practical operation, the magnitude of this one-way delay is very small, as compared with the value of image delay defined in the present application, and thus can be omitted.

(F) When the image obtaining device 1 is collecting an image, a global time for collecting an image based on the time of the image processing device 2 is $T_d+(t_c-t_d)+T_{latency}$, and that is to say, the corresponding global time based on the time of the image processing device 2 is $T_d+(t_c-t_d)$ by omitting $T_{latency}$. The two pieces of information (i.e., the ID number of detection previously received by the image obtaining device 1 and the global time $T_d+(t_c-t_d)$ for collecting an image based on the time of the image processing device 2) and the encoded data of the collected image frame after being encoded are mixed together, in a certain encapsulated format, by the image obtaining device 1, to form a data packet of image delay detection of this image frame for transmission or storage. The encapsulation can be of an existing encapsulating mode for image encoded data, ID data and temporal data, etc, and a variety of existing encapsulating formats all enable the encapsulation of private data under the standard framework thereof.

(G) The image processing device 2 can preview video images of the image obtaining device 1 by using software that can preview the image obtaining device 1 (e.g., media player software and the like). Thus, the image processing device 2 analyzes the data packet of data with detection delay, while receiving media stream data from the image obtaining device 1 and analyzing, decoding and displaying these data (the data transmission and reception as shown in FIG. 2).

When the transmitted data are received, the analysis, decoding of the data may be carried out after data buffering, and display buffering may also occur when it is ready for display after the decoding of the data completes.

If an image frame carries corresponding data packet of data for delay detection after the displaying of this image frame completes, the reference global time $T=T_d+(t_c-t_d)$ for collecting the image, when the frame of data image is collected, is analyzed from this data packet, and the current global time $T_{display}$ of the image processing device 2 is recorded. The delay $T_{delay}$ of this image frame is for example calculated with equation (2):

$$T_{delay}=T_{display}-(T_d+(t_c-t_d)). \tag{2}$$

Moreover, it is possible to feed back the value of delay $T_{delay}$ of this image frame by the image processing device 2, by means of a media player software or other program software for statistics or display. Specifically, the image processing device 2 can embed or deliver this value of delay into other program software by some software programs so as to carry out statistics, storage, delivery (such as delivery to the corresponding image obtaining device 1) or display the delay and the like. For example, as shown in FIG. 2, the calculated delay $T_{delay}$ of an image is also displayed while the image is displayed.

(H) Further, if the previous timing sequences (A)-(G) are repeated, it is possible to carry out statistics for image delays $T_{delay}$ for many times and thus obtain the average value of the $T_{delay}$, thereby obtaining the image delay detection value that is statistically more meaningful or more accurate, more precise.

Figure 3:
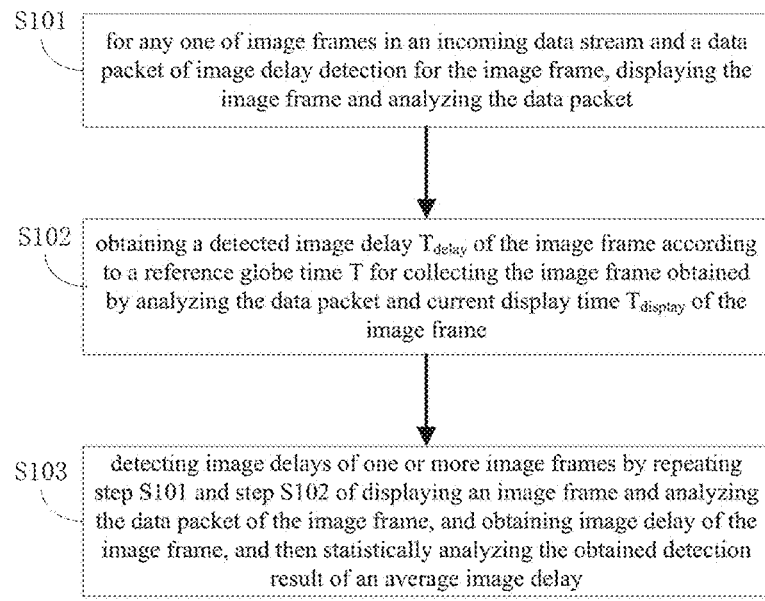
FIG. 3 is a flowchart of an embodiment of a method for detecting image delay according to the present application.

FIG. 3 is a flowchart of an embodiment of a method for detecting image delay according to the present application.

The implementation of the present application is further described below in combination with an embodiment of the method for detecting image delay of the present application shown in FIG. 3. The method of the present application also corresponds to the processes implemented by the system previously described.

In step 101: for any one of image frames in an incoming data stream and a data packet of image delay detection for the image frame, displaying the image frame and analyzing the data packet.

In an embodiment, an image frame in a media data stream may have a corresponding data packet of detecting the delay of this image frame, during the image processing device 2 (such as client computer) obtains the media data stream from the image obtaining device 1 and analyzes, encodes and displays it. The data packet includes related delay detection data, for example includes the collection time $T=T_d+(t_c-t_d)$ for this image frame. The collection time T is the global time for collecting an image based on the time of this image processing device 2 (as the description of the system previously described), when the image obtaining device 1 is collecting the image frame. When the image processing device 2 is displaying this image frame, the display time thereof $T_{display}$ is recorded and meanwhile the collection time T of this image frame is obtained by analyzing this data packet.

The collection time T is not affected by the frequency refresh, due to that the time T does not utilize the time of the image obtaining device 1 but is represented based on the time of the image processing device 2.

Figure 4:
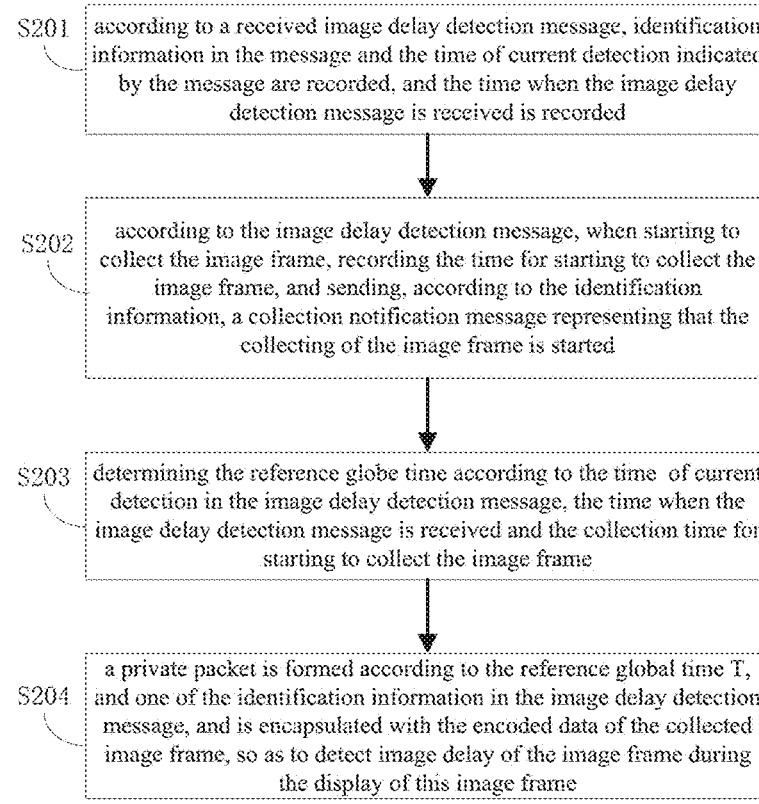
FIG. 4 is a flowchart of an embodiment of generating a data packet corresponding to an image frame in the method for detecting image delay according to the present application.

FIG. 4 is a flowchart of an embodiment of generating a data packet corresponding to an image frame in a method for detecting image delay according to the present application.

An implementation of obtaining the collection time T from a data packet is described below, in combination with a flowchart of an embodiment of generating a data packet corresponding to an image frame, in a method for detecting image delay of the present application as shown in FIG. 4.

In step S201, according to a received image delay detection message, identification information in the message and the time of current detection indicated by the message are recorded, and the time when the image delay detection message is received is recorded.

In an implementation, the image obtaining device 1 (e.g., a camera) added with a communication interface that supports messages with a certain format. Meanwhile, the image processing device 2 (e.g., a client computer) is also provided with a communication interface that supports messages with this format. The communication interface and message format can be any existing known communication interface and message format that are capable of supporting the transmission of image data. The message format includes, but not limited to, an IP message format, a TCP message format, a UDP message format and the like. The image obtaining device 1 and the image processing device 2 are connected via a communication network so as to transmit image data, and send and receive messages via the communication interface.

The image processing device 2 sends an image delay detection message to the image obtaining device 1, according to the message format of this newly-added communication interface of the image obtaining device 1. This message may include the ID number (e.g., GUID) of current detection, which is used for uniquely identifier the current detection for image delay (i.e., the identification information identifying the current detection); the communication address of the image processing device 2 (e.g., if the communication system is Ethernet, the communication address of the image processing device 2 can be the IP address of the device), i.e., the identification information identifying the device sending the message to request of detecting the image delay, the current global time of the image processing device 2 is $T_d$ (year, month, date, hour, minute, second and millisecond) (i.e., the time of the device that sends the message when the current detection starts). Moreover, the image obtaining device 1, after receiving the message, records various identification information indicated by the message, the current global time of a sender the image processing device 2) and the time when this message is received.

In this way, it is possible to record the collection time $t_c$ of an image frame based on the time $t_d$ of the image delay detection message; the collection time $t_c$ of this image frame is later than the time $t_d$ when the image delay detection message is received.

Specifically, the image obtaining device 1 records the collection time $t_c$ of the image frame based on the time $t_d$ of the image delay detection message.

In step S202, according to the image delay detection message, when starting to collect the image frame, recording the time for starting to collect the image frame, and sending, according to the identification information, a collection notification message representing that the collecting of the image frame is started.

Further, it is also possible to analyze the one-way delay in the communication, to determine whether the magnitude thereof can be ignorable, according to the time of the current detection, the time when the image delay detection message is received, the time for starting to collect an image frame and the time when the collection notification message is received.

In an implementation, when the image obtaining device 1 starts to collect the next image frame, the time $t_c$ (year, month, date, hour, minute, second and millisecond) for starting to collect the image is recorded. Meanwhile, according to the recorded communication address of the image processing device 2, a message is sent to the image processing device 2 that initiate the detection. The message includes the previously received ID number of the detection, i.e., the image obtaining device 1 sends a collection notification message to the corresponding image processing device 2. Moreover, the collected image frame is encoded for data transmission. Moreover, the collected image frame is encoded for data transmission. Thus, the image processing device 2 can receive a collection notification message that represents the collecting of an image frame is started, and record the receiving time $T_c$ after receiving the collection notification message.

Further, it can be obtained by analyzing that it is possible to calculate the one-way delay $T_{latency}=((T_c-T_d)-(t_c-t_d))/2$ of the communication present between the image obtaining device 1 and the image processing device 2, according to the global time $T_d$ of the image processing device 2 when it sends a delay detection message, the global time $t_d$ of the image obtaining device 1 when it receives the delay detection message, the time $t_c$ when the image obtaining device 1 starts to collect the image after handshake, and the time $T_c$ when the image processing device 2 receives the collection notification message that the image obtaining device 1 is collecting this image frame. It is also very close to the $T_{latency}$ result calculated with the algorithm in the document of "a method for measuring one-way delay", but in the practical operation, the magnitude of this one-way delay is very small compared with the value of image delay defined in the present application, and thus can be omitted.

In step S203, determining the reference global time T, according to the time $T_d$ of current detection in the image delay detection message, the time $t_d$ when the image delay detection message is received and the collection time $t_c$ for starting to collect the image frame.

Further, the reference global time can be determined in combination with one-way delay of communication obtained by analysis.

In an implementation, the reference global time is established based on the time of the image processing device 2 by the collection time T of the image obtaining device 1 and is not affected by the refresh of the image processing device 2, such that the obtained image delay of the image obtaining device 1 is more accurate.

For example: $T=T_d+(t_c-t_d)+T_{latency}$.

The optimized reference global time T can be $T=T_d+(t_c-t_d)$ since the value of $T_{latency}$ is very small and thus ignorable.

In step S204, a private packet is formed according to the reference global time T, and one of the identification information in the image delay detection message, and is encapsulated with the encoded data of the collected image frame, so as to detect image delay of the image frame during the display of this image frame.

The identification information in the message includes the corresponding ID number, the address of the message sending side and the like, and the identification information encapsulated into a data packet here is the ID number.

The reference global time T and one of the identification information in the image delay detection message, as the private data of the collected image frame, are mixed in a certain encapsulated format after the image frame forms encoded data for transmission or storage. One possible way is to transmit them to the side that sends the image delay detection message for display. For example, when the media data stream that includes this image frame is played, the obtained private data are analyzed during the display of this image frame, and the current display time of this image frame is recorded, so as to calculate the delay of this image frame.

One of the identification information in the image delay detection message represents one piece of identification information in the image delay detection message.

In an implementation, the two information (i.e., the ID number of delay detection previously received by the image obtaining device 1, and the global time $T_d+(t_c-t_d)$ for collecting an image based on the time of the image processing device 2) and the encoded data of the collected image frame after being encoded are mixed together, in a certain encapsulated format by the image obtaining device 1, to form a data packet of the image delay detection for this image frame for transmission or storage. The encapsulation can be of an encapsulated mode such as existing image encoded data, ID data and temporal data, and a variety of existing encapsulated formats enable the encapsulation of private data under the standard framework thereof.

In step S102, obtaining a detected image delay $T_{delay}$ of the image frame, according to a reference global time T for collecting the image frame obtained by analyzing the data packet and current display time $T_{display}$ of the image frame.

In an implementation, the image delay $T_{delay}=T_{display}-(T_d+(t_c-t_d))$ of the detected image frame can be obtained by calculation, according to the collection time T in the analyzed data packet corresponding to this image frame, and the time $T_{display}$ when the image processing device 2 is currently displaying the image frame.

Specifically, the image processing device 2 can preview video images of the image obtaining device 1 by using a software that can preview the image obtaining device 1 (e.g., a media player software). Thus, the image processing device 2 analyzes the data packet of data with detection delay, while receiving media stream data from the image obtaining device 1 and analyzing, decoding and displaying these data (the data transmission and reception as shown in FIG. 2).

When the transmitted data are received, there may be data buffering after which analysis and decoding are carried out, and display buffering may also exist when it is ready for display after decoding completes.

If an image frame is provided with corresponding data packet of data for delay detection after the display of this image frame completes, the global time $T=T_d+(t_c-t_d)$ (i.e., reference global time) for collecting the image, when the frame of data image is being collected, is analyzed from this data packet, and the current global time $T_{display}$ of the image processing device 2 when the display of the corresponding image frame is recorded.

Thus, the image processing device 2 records the displaying time of the image frame on the image processing device 2, and the difference between the time of displaying the image frame and the collection time T of the image frame is the detected image delay of the corresponding image frame. The delay of this image frame $T_{delay}$ is: $T_{delay}=T_{display}-(T_d+(t_c-t_d))$.

Moreover, it is possible to feed back the value of delay $T_{delay}$ of this image frame by the image processing device 2 by means of the media player software or other program software for statistics or display. Specifically, the image processing device 2 can embed or deliver this value of delay to other program software by some software programs for statistics, storage, delivery (such as delivery to the corresponding image obtaining device 1) or displaying the delay and the like. For example, as shown in FIG. 2, the calculated delay $T_{delay}$ of an image is also displayed while the display of the image.

In step S103, detecting image delays of one or more image frames by repeating step S101 and step S102 of displaying an image frame and analyzing the data packet of the image frame, and obtaining image delay of the image frame, and then statistically analyzing the obtained detection result of an average image delay.

The previous steps can be repeated for a plurality of image frames and the average value of obtained image delays of a plurality of image frames is used as the image delay of the image obtaining device.

In this way, it is possible to carry out automatic delay detection at the side of a display terminal (i.e., the image processing device 2) by identifying delay detection with the set delay detection data. Meanwhile, the collection time T is based on the time of the image processing device 2 that sends requests for detection and image collection, and is not affected by the refresh of the image processing device 2 itself, such that the obtained image delay is more accurate.

A particular application example of the solution of the present application is described below in combination with FIGS. 1-2 and 2. Here, the image obtaining device 1 is a camera 3, wherein the camera may be a network camera, or a combination of a camera and an encoder, the image processing device 2 is a client computer 4. The image obtaining device 1 and the image processing device 2 are connected with each other by a communication network. This application example describes the procedure from the start of delay detection to the display of image and the calculation of delay.

Step S1: this is a handshake procedure, i.e., the client computer 4 sends at the time $T_d$ thereof a delay detection information to the camera 3, wherein the delay detection information including time $T_d$.

Further, an ID of the current delay detection is also included for uniquely identifying the current detection and the communication address of the client computer 4. The camera 3 receives, at the time $t_d$ thereof, the delay detection information sent by the client computer 4, and records the time $T_d$ when the client computer 4 initiates the delay detection, and even the ID of the current delay detection, the communication address of the client computer 4.

The delay detection information here is identical with the delay detection message described above.

Step S2: the camera 3 collects an image frame and records the time $t_0$ thereof for starting to collect the image, and sends an image collection notification to the client computer 4, according to the recorded communication address of the client computer 4 that receives the image collection notification at the time $T_c$ thereof.

Here, the image collection notification described above is identical with the collection notification message described above.

Step S3: the camera 3 collects the image, and encodes the collected corresponding image frame and the delay detection data (data such as image collection time T), which also includes the communication address of the client computer 4 and ID of the delay detection.

Step S4: the encoded image frame is transmitted from the camera 3 to the client computer 4.

In Step S5 and step S6, respectively, an image frame is received by the client computer 4 and the image frame is analyzed and encoded so as to obtain the collection time T thereof; wherein, the collection time T is the sum of one-way delay $T_{latency}$ and the time $T_d+(t_c-t_d)$, wherein $T_{latency}=((T_c-T_d)-(t_c-t_d))/2$. But in the present application, the value of $T_{latency}$ is very small and thus is ignorable, thus the collection time T can be determined as $T_d+(t_c-t_d)$. As a result, the collection time T will not be affected by the refresh of the client computer 4, which makes the obtained image delay of the camera 3 more accurate.

Moreover, in steps S5 and S6, there is a buffer from receipt of data to analysis and encoding of data and from analysis and encoding of data to the display of an image, such as a data buffering S51, a display buffering S61.

Step S7: the client computer 4 displays an encoded image frame and records the display time $T_{display}$ thereon, and obtains the camera delay according to the difference between $T_{display}$ and the collection time T.

According to the present application, the delay detection data are provided in the collected image frame, and the time for collecting the image frame is based on the time of an image processing device. In this way, manual operations (such as obtaining the time for collecting an image by screenshot and the like) are not needed and the collection time is not affected by frequency refresh of the image processing device, and therefore there is no error in the delay detection method and system.

Similarly, in other embodiments, a camera repeats the steps described above for a plurality of image frames, and an average value of image delays of the plurality of obtained image frames is used as the image delay of the camera, which can lead to a more accurate camera delay.

Embodiments of the present application provide an application program, which is configured to carry out the method for detecting image delay provided by the embodiments of the present application when executed. The method for detecting image delay includes:

for any one of image frames in an incoming data stream and a data packet of image delay detection for the image frame, displaying the image frame and analyzing the data packet; and obtaining a detected image delay $T_{delay}$ of the image frame according to a reference global time T for collecting the image frame obtained by analyzing the data packet and current display time $T_{display}$ of the image frame.

In a particular implementation of the present application, in the method for detecting image delay carried out by the application program when executed, the reference global time T for collecting the image frame can be determined by:

according to a received image delay detection message, recording identification information in the message and time $T_d$ of current detection indicated by the message, and recording time $t_d$ when the image delay detection message is received; wherein, collection time $T_c$ of the image frame representing the time for starting to collect the image frame is recorded with the time $t_d$ when the image delay detection message is received as a basis; wherein, the collection time $t_c$ of the image frame is later than the time $t_d$ the image delay detection message is received;

recording the collection time $t_c$ of the image frame representing the time for starting to collect the image frame, according to the image delay detection message, and sending, according to the identification information, a collection notification message representing that the collecting of the image frame is started; and determining the reference global time T, according to the time $T_d$ of current detection in the image delay detection message, the time $t_d$ when the image delay detection message is received and the collection time $t_c$ of the image frame.

In a particular implementation of the present application, in the method for detecting image delay carried out by the application program when executed, the reference global time T is $T_d+(t_c-t_d)$.

In a particular implementation of the present application, in the method for detecting image delay carried out by the application program when executed, the reference global time T can also include:

one-way delay $t_{latency}$ in communication transmission; wherein, the one-way delay $T_{latency}$ is determined according to the time $T_d$ of current detection, the time $t_d$ when the image delay detection message is received, the collection time $t_c$ of the image frame and the time $T_c$ when the image frame is received.

In a particular implementation of the present application, in the method for detecting image delay carried out by the application program described above, the reference global time T is $T_{latency}+T_d+(t_c-t_d)$, wherein, the one-way delay $T_{latency}=((T_c-T_d)-(t_c-t_d))/2$.

In a particular implementation of the present application, in the method for detecting image delay carried out by the application program described above, the step of obtaining a detected image delay $T_{delay}$ of the image frame according to a reference global time T for collecting the image frame obtained by analyzing the data packet and current display time $T_{display}$ of the image frame can include:

detecting the image delay $T_{delay}=T_{display}-T$ of the image frame; wherein, the reference global time T is $T_d+(t_c-t_d)+T_{latency}$ or $T_d+(t_c-t_d)$, wherein, $T_{latency}$ is one-way delay in communication transmission.

In a particular implementation of the present application, the method for detecting image delay carried out by the application program described above can further include:

detecting the image delay $T_{delay}$ of one or more image frames by repeating the steps of displaying the image frame, analyzing the data packet and obtaining the image delay $T_{delay}$ of the detected image frame, and averaging the obtained image delays.

Embodiments of the present application provide a storage medium, which is configured to store an application program that is configured to carry out the method for detecting image delay provided by the embodiments of the present application. Wherein, the method for detecting image delay can include:

for any one of image frames in an incoming data stream and a data packet of image delay detection for the image frame, displaying the image frame and analyzing the data packet; and obtaining a detected image delay $T_{delay}$ of the image frame according to a reference global time T for collecting the image frame obtained by analyzing the data packet and current display time $T_{display}$ of the image frame.

In a particular implementation of the present application, in the method for detecting image delay executed by the application program stored in the storage medium described above, the reference global time T for collecting the image frame can be determined by:

according to a received image delay detection message, recording identification information in the message and time $T_d$ of current detection indicated by the message, and recording time $t_d$ when the image delay detection message is received; wherein, collection time $t_c$ of the image frame representing the time for starting to collect the image frame is recorded with the time $t_d$ when the image delay detection message is received as a basis; wherein, the collection time $t_c$ of the image frame is later than the time $t_d$ when the image delay detection message is received;

recording the collection time $t_c$ of the image frame representing the time for starting to collect the image frame, according to the image delay detection message, and sending, according to the identification information, a collection notification message representing that the collecting of the image frame is started; and determining the reference global time T, according to the time $T_d$ of current detection in the image delay detection message, the time $t_d$ when the image delay detection message is received and the collection time $t_c$ of the image frame.

In a particular implementation of the present application, in the method for detecting image delay carried out by the application program stored in the storage medium described above, the reference global time T is $T_d+(t_c-t_d)$.

In a particular implementation of the present application, in the method for detecting image delay carried out by the application program stored in the storage medium described above, the reference global time T can also include:

one-way delay $T_{latency}$ in communication transmission; wherein, the one-way delay $T_{latency}$ is determined according to the time $T_d$ of current detection, the time $t_d$ when the image delay detection message is received, the collection time $t_c$ of the image frame and the time $T_c$ when the image frame is received.

In a particular implementation of the present application, in the method for detecting image delay executed by the application program stored in the storage medium, the reference global time T for collecting the image frame is $T_{latency}+T_d+(t_c-t_d)$, wherein, $$T_{latency}=((T_c-T_d)-(t_c-t_d))/2.$$

In a particular implementation of the present application, in the method for detecting image delay carried out by the application program stored in the storage medium described above, the step of obtaining a detected image delay $T_{delay}$ of the image frame according to a reference global time T for collecting the image frame obtained by analyzing the data packet and current display time $T_{display}$ of the image frame can include:

detecting the image delay $T_{delay}=T_{display}-T$ of the image frame; wherein, the reference global time T is $T_d+(t_c-t_d)+T_{latency}$ or $T_d+(t_c-t_d)$, wherein, $T_{latency}$ is one-way delay in communication transmission.

In a particular implementation of the present application, the method for detecting image delay carried out by the application program stored in the storage medium described above can further include:

detecting the image delay $T_{delay}$ of one or more image frames by repeating the steps of displaying the image frame, analyzing the data packet and obtaining the image delay $T_{delay}$ of the detected image frame, and averaging the obtained image delays.

It should be noted that the definition using identical alphabets describes the same object in various embodiments of the present patent, "detection" mentioned in the present patent all refers to "delay detection", and the "image delay" mentioned in the present patent is image latency.

It should be noted that the relationship terms herein such as "first", "second" and the like are only used to distinguish one entity or operation from another entity or operation, but do not necessarily require or imply that there is actual relationship or order between these entities or operations. Moreover, the terms "include", "comprise" or any variants thereof are intended to cover a non-exclusive inclusion, such that processes, methods, articles or devices comprising a series of elements not only comprise those elements listed, but also comprise other elements not specifically listed or the elements intrinsic to these processes, methods, articles, or devices. Without further limitations, elements limited by the wording "comprise(s) a/an . . . " do not exclude that there are additional identical elements in the processes, methods, articles, or devices, which comprise the listed elements.

It will be understood by one of ordinary skills in the art that all or part of the steps in the embodiments, which implement the method described above, can be implemented by instructing the related hardware with programs, which can be stored in a computer readable storage medium such as ROM/RAM, magnetic disk, optical disk or the like.

It should be noted that the specified embodiments of the present application described above only serve for illustrating or explaining the principle of the present application, and are not indented to limit the present application. Thus, all the modifications, alternatives, improvements or the like made without departing from the spirit and scope of the present application should be included in the protection scope of the present application. Moreover, the following claims of the present application are intended to cover all the variations and modifications falling within the scope and the boundary of the claims or within the equivalents of such scope and boundary.

The invention claimed is:

1. A method for detecting image delay, comprising:
   displaying, any one of image frames in an incoming data stream and analyzing a data packet for image delay detection of the displayed image frame; and
   obtaining a detected image delay $T_{delay}$ of the displayed image frame, according to a reference global time T for collecting the image frame obtained by analyzing the data packet and current display time $T_{display}$ of the displayed image frame, wherein the reference global time T for collecting the image frame is determined by:

according to a received image delay detection message, recording identification information in the message and time $T_d$ of current detection indicated by the message, and recording time $t_d$ when the image delay detection message is received; wherein, collection time $t_c$ of the image frame representing a time for starting to collect the image frame is recorded, with the time $t_d$ when the image delay detection message is received as a basis; wherein, the collection time $t_c$ of the image frame is later than the time $t_d$ when the image delay detection message is received;

recording the collection time $t_c$ of the image frame representing a time for starting to collect the image frame, according to the image delay detection message, and sending, according to the identification information, a collection notification message representing that the collecting of the image frame is started; and determining the reference global time T, according to the time $T_d$ of current detection in the image delay detection message, the time $t_d$ when the image delay detection message is received and the collection time $t_c$ of the image frame.

2. The method according to claim 1, wherein the reference global time T is $T_d+(t_c-t_d)$.

3. The method according to claim 2, wherein obtaining a detected image delay $T_{delay}$ of the image frame, according to a reference global time T for collecting the image frame obtained by analyzing the data packet and current display time $T_{display}$ of the image frame, comprises:

detecting the image delay $T_{delay}=T_{display}-T$ of the image frame; wherein, the reference global time T is $T_d+(t_c-t_d)+T_{latency}$ or $T_d+(t_c-t_d)$, wherein, $T_{latency}$ is one-way delay in communication transmission.

4. The method according to claim 1, wherein the reference global time T also comprises:

one-way delay $T_{latency}$ in communication transmission; wherein, the one-way delay $T_{latency}$ is determined, according to the time $T_d$ of current detection, the time $t_d$ when the image delay detection message is received, the collection time $t_c$ of the image frame and the time $T_c$ when the image frame is received.

5. The method according to claim 4, wherein the reference global time T is $T_{latency}+T_d+(t_c-t_d)$, wherein, $T_{latency}=((T_c-T_d)-(t_c-t_d))/2$.

6. The method according to claim 5, wherein obtaining a detected image delay $T_{delay}$ of the image frame, according to a reference global time T for collecting the image frame obtained by analyzing the data packet and current display time $T_{display}$ of the image frame, comprises:

detecting the image delay $T_{delay}=T_{display}-T$ of the image frame; wherein, the reference global time T is $T_d+(t_c-t_d)+T_{latency}$ or $T_d+(t_c-t_d)$, wherein, $T_{latency}$ is one-way delay in communication transmission.

7. The method according to claim 1, wherein the method further comprises:

detecting the image delay $T_{delay}$ of one or more image frames by repeating the steps of displaying the image frame, analyzing the data packet and obtaining the image delay $T_{delay}$ of the detected image frame, and averaging the obtained image delays.

8. A non-transitory storage medium, wherein it is configured to store an application program that is configured to carry out the method for detecting image delay of claim 1.

9. A system for detecting image delay, comprising: an image obtaining device, an image processing device, and a communication line connecting the image obtaining device and the image processing device; wherein, the image processing device is configured to, display, any one of image frames in data stream transmitted via the communication line from the image obtaining device and analyzing a data packet for image delay detection of the displayed image frame, then obtain the detected image delay $T_{delay}$ of the displayed image frame according to a reference global time T for collecting the image frame obtained by analyzing the data packet and current display time $T_{display}$ of the displayed image frame;

the image obtaining device is configured to collect an image frame and determine the reference global time T of the collected image frame according to an image delay detection message transmitted by the image processing device for the image frame, wherein the image obtaining device is further configured to:

according to the image delay detection message for the image frames transmitted by the image processing device, record identification information in the message and time $T_d$ of current detection indicated by the message, and record time $t_d$ when the image delay detection message is received;

record the collection time $t_c$ of the image frame representing a time for starting to collect the image frame, according to the image delay detection message, and send, according to the identification information, a collection notification message representing that the collecting of the image frame is started to the corresponding image processing device;

determine the reference global time T, according to the time $T_d$ of current detection in the image delay detection message, the time $t_d$ when the image delay detection message is received and the collection time $t_c$ of the image frame; and form a data packet according to the reference global time T and one of the identification information in the image delay detection message and encapsulate this data packet with encoded data of the collected image frame and send to the corresponding image processing device.

10. The system according to claim 9, wherein the image processing device is further configured to:

detect the image delay $T_{delay}=T_{display}-T$ of the image frame; wherein, the reference global time T is $T_d+(t_c-t_d)+T_{latency}$ or $T_d+(t_c-t_d)$; and wherein, the $T_{latency}$ is one-way delay present in the communication transmission between the image obtaining device and the image processing device.

11. The system according to claim 10, wherein:

the image processing device is a client computer, and the image obtaining device is a camera; wherein, the camera is equipped with a communication interface that supports a certain message format, the client computer is provided with a communication interface that supports the message format; and the client computer sends an image delay detection message of an image frame to the camera according to the message format of the communication interface of the camera.

12. The system according to claim 9, wherein the data packet at least comprises the following information: an ID number indicating the current detection in the identification information and the reference global time T.

13. The system according to claim 12, wherein:
the image processing device is a client computer, and the image obtaining device is a camera; wherein,
the camera is equipped with a communication interface that supports a certain message format, the client computer is provided with a communication interface that supports the message format; and
the client computer sends an image delay detection message of an image frame to the camera according to the message format of the communication interface of the camera.

14. The system according to claim 9, wherein:
the image processing device is further configured to send an image delay detection message for an image frame to the image obtaining device many times;
the image obtaining device is further configured to collect a plurality of image frames according to the received image delay detection messages, determine a reference global time T of each image frame of the plurality of image frames, form a data packet for each image frame and encapsulate the data packet with the encoded data of the corresponding image frame, and send to the corresponding image processing device;
the image processing device is further configured to analyze data packets of the plurality of displayed image frames to obtain a plurality of reference global time T, detect image delays $T_{delay}$ of the plurality of image frames in combination with the display time $T_{display}$ of the plurality of displayed image frames, and average the image delays $T_{delay}$ of the plurality of image frames to obtain the average value of image delay $T_{delay}$ as a result of image delay detection.

15. The system according to claim 14, wherein: the image processing device is a client computer, and the image obtaining device is a camera; wherein,
the camera is equipped with a communication interface that supports a certain message format, the client computer is provided with a communication interface that supports the message format; and
the client computer sends an image delay detection message of an image frame to the camera according to the message format of the communication interface of the camera.

16. The system according to claim 9, wherein: the image processing device is a client computer, and the image obtaining device is a camera; wherein,
the camera is equipped with a communication interface that supports a certain message format, the client computer is provided with a communication interface that supports the message format; and
the client computer sends an image delay detection message of an image frame to the camera according to the message format of the communication interface of the camera.

17. The system according to claim 9, wherein: the image processing device is a client computer, and the image obtaining device is a camera; wherein,
the camera is equipped with a communication interface that supports a certain message format, the client computer is provided with a communication interface that supports the message format; and
the client computer sends an image delay detection message of an image frame to the camera according to the message format of the communication interface of the camera.

* * * * *